United States Patent [19]

Nemoto

[11] 3,789,452

[45] Feb. 5, 1974

[54] TAPE AND CASSETTE FOR CLEANING MAGNETIC RECORDING HEADS

[75] Inventor: Tsuneo Nemoto, Miyagi, Japan

[73] Assignee: Sony Corporation, Tokyo, Japan

[22] Filed: Sept. 17, 1971

[21] Appl. No.: 181,342

[30] Foreign Application Priority Data

Sept. 18, 1970 Japan .............................. 45-92601

[52] U.S. Cl. ........... 15/210 R, 274/47, 179/100.2 Z

[51] Int. Cl. .......................... G11b 5/00, G11b 3/58

[58] Field of Search ..... 15/210 R; 352/235; 274/47; 179/100.2 Z

[56] References Cited

UNITED STATES PATENTS

| | | | |
|---|---|---|---|
| 3,647,990 | 3/1972 | Eul, Jr. et al. | 274/47 |
| 2,774,127 | 12/1956 | Secrist | 15/210 R |
| 2,992,447 | 7/1961 | Hicks | 15/210 R |
| 3,439,922 | 4/1969 | Howard | 15/210 R UX |

*Primary Examiner*—Leon G. Machlin

*Attorney, Agent, or Firm*—Lewis H. Eslinger; A. Sinderbrand

[57] ABSTRACT

A tape cassette for use in recording and reproducing apparatus having magnetic heads adapted to be engaged with tape in the cassette includes a generally hollow case, a pair of tape reels rotatably mounted therein, and a magnetic head cleaning tape having its ends respectively secured to the reels for winding thereon. The tape has a base formed of a non-woven fibrous material and a plurality of reinforcing threads are located on at least one side thereof for engaging the magnetic head during operation of the apparatus to wipe the head and remove dust and other impurities therefrom.

9 Claims, 4 Drawing Figures

TAPE AND CASSETTE FOR CLEANING MAGNETIC RECORDING HEADS

The present invention relates to tapes and tape cassettes for use with recording and reproducing apparatus having magnetic heads, and more particularly to a tape, and a cassette therefor, for cleaning the magnetic recording and reproducing head and other components of the recording and reproducing apparatus.

It is well known that after extended periods of use the magnetic heads in magnetic tape recording and reproducing equipment accumulate a layer or coating of magnetic powder ($Fe_2O_3$) and/or dust from contact with the tape, particularly at the air gap in the head. This powder and other dust particles also accumulates on the capstan, pinch roller and guide rollers adjacent the head. As a result the quality of the recording and/or reproducing functions of the tape recorder are seriously deteriorated.

In order to overcome these difficulties, it has previously been proposed to provide a cleaning stick or brush for cleaning the components of the tape recorder when necessary. However, it has been found that it is difficult to use the cleaning stick or brush, particularly if the magnetic head is located within an enclosure on the tape recorder or is otherwise hidden or located in position in which cleaning with the stick is impossible. Moreover, the stick does not completely clean the head even when it is readily accessible. Other proposed systems include so-called lapping tape, which is a tightly woven, rough surfaced tape adapted to be moved against the magnetic recording head; however, the roughness of the tape and the chemicals which are often applied thereto result in excessive wear and damage to the magnetic head and does not provide a good cleaning action. Still another proposed cleaning system has been the use of treated paper tapes, however, paper is too weak for use as a tape and thus has not been satisfactory in use.

Accordingly, it is an object of the present invention to provide high-quality cleaning of the magnetic head and certain other components in a magnetic tape recording and reproducing system.

It is another object of the present invention to provide a strong, durable cleaning tape mounted in a cassette for use in cassette-type tape recording and reproducing equipment.

Still another object of the present invention is to provide a simple and inexpensive magnetic head cleaning system for cassette-type tape recording and reproducing equipment.

According to an aspect of the present invention a tape cassette, of generally conventional construction, such as for example the well known Phillips type cassette, and having a generally rectangular hollow case and a pair of tape reels rotatably mounted therein, is provided with a magnetic head cleaning tape mounted therein for use in cleaning the magnetic head and other adjacent components in a magnetic tape recording and reproducing apparatus. The tape is formed from a base of non-woven fibrous material and has a reinforcing scrim of relatively widely spaced threads secured to at least one side of the base. The tape is adapted to engage the magnetic head in the recording and reproducing apparatus during operation, for wiping the head to remove dust or other impurities or the like therefrom. The reinforcing threads, in one embodiment of the present invention, are located on the side of the base which engages the head, and form projections thereon for providing positive engagement with the head in order to completely remove dust particles and the like. The threads are formed in a woven scrim with certain of the threads extending across the width of the tape and the remainder of the threads extending substantially along the longitudinal axis of the tape but at a slight angle thereto. The threads are widely spaced so that the smooth flexible non-woven base portion engages the tape for cleaning it while the threads provide a reinforcing function and positive engagement with dust particles adhered to the head.

As a result of this construction, a strong and durable cleaning tape is provided for magnetic tape recording and reproducing equipment. The cleaning of the apparatus is simply performed because the cassette is inserted just as a normal magnetic tape cassette and the cleaning action occurs upon operation of the device in the playing, wind or rewind modes, as the tape passes over the magnetic head. Moreover, the tape cassette of the present invention is readily manufactured since the cassette is of conventional construction and thus no special equipment, other than the tape itself, is required for cleaning the apparatus.

The above, and other objects, features and advantages of this invention, will be apparent in the following detailed description of an illustrative embodiment thereof which is to be read in connection with the accompanying drawings, wherein.

Figure 1:
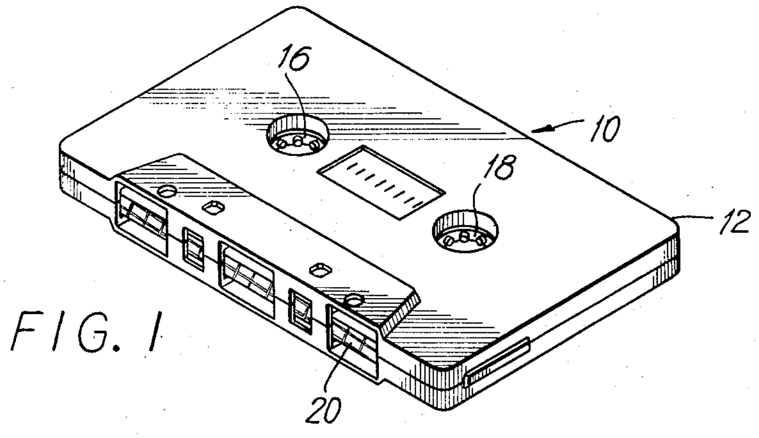
FIG. 1 is a perspective view of a tape cassette having a magnetic head cleaning tape wound therein and constructed in accordance with an embodiment of the present invention.

Referring now to the drawings, and initially to FIG. 1 thereof, it is seen that a tape cassette 10, embodying the present invention, as shown therein, includes a generally rectangular hollow case 12 having a pair of reels 16 and 18 rotatably mounted therein. Case 12 is similar in construction to conventional and well known tape cassettes, such as for example, the well known "Phillips" type cassette.

Figure 2:
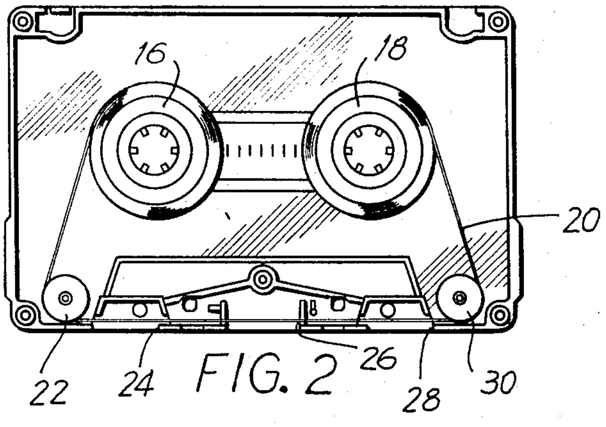
FIG. 2 is a plan view of the cassette illustrated in FIG. 1, with the top thereof removed.

A tape 20 is secured within cassette case 12 and has its opposed ends respectively secured to reels 16 and 18. In this manner, tape 20 is adapted to be wound on reels 16 and 18 as the reels are respectively driven in accordance with the selected mode of operation of the tape recording and reproducing device in which the cassette is used. As seen in FIG. 2, tape 20 extends from reel 16 over a roller 22 in the cassette and past a series of openings 24,26 and 28 through which the capstan, pinch roller and magnetic head of the tape recording and reproducing device engage tape in the cassette during operation of the apparatus. The tape returns over roller 30 to reel 18 and is wound thereon.

Figure 3:
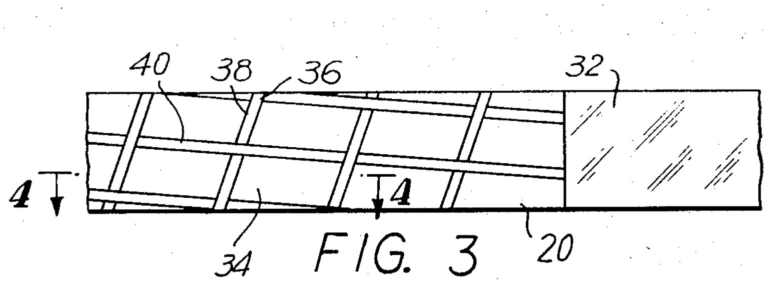
FIG. 3 is an enlarged plan view of one end of a tape constructed in accordance with the present invention.

The ends of the tape 20 are secured to the reels 16 and 18 by plastic leader portions 32 at each end thereof. These leader portions, one of which is shown in FIG. 3, have a relatively short length, for example 2 or 3 inches, and are made of a plastic material having greater strength than the tape 20 so as to provide a permanent connection between the tape and the reel, thereby to avoid the possibility of tearing of the tape at the connection thereof to the reel.

Tape 20 is formed with a base portion 34 formed of a non-woven fibrous material, such as for example nylon or rayon. The base is relatively smooth and flexible and provides a good cleaning medium to which dust and the like is adhered as the tape is passed against the magnetic head and other components of the recording and reproducing device, i.e., the capstan and the pinch and guide rollers, in order to remove magnetic dust and other impurities therefrom.

Figure 4:
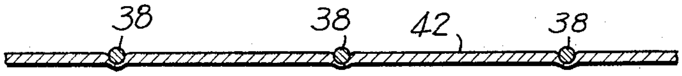
FIG. 4 is a sectional view taken on lines 4—4 of FIG. 3.

The tape is reinforced by a scrim or reinforcing layer 36 formed of a plurality of relatively widely spaced threads 38 and 40. These threads are also formed of nylon or rayon, and, in the preferred embodiment, are woven together and secured to one side of the base 34. The threads may be secured to the base during the formation of the non-woven base, and thus be partially embedded on one side thereof, or may otherwise be adhered to the base in any convenient manner. Preferably, the threads are secured to the side 42 of the base (FIG. 4) which is adapted to engage the magnetic head during the cleaning operation. These threads form projections on surface 42 which engage the head to provide a positive contact therewith for high quality cleaning of the head and the other components with which the tape is engaged. (In this embodiment the opposite side 43 of the tape remains relatively flat and smooth.) The threads are widely spaced and thus do not provide a continuous rough surface, as with previously proposed fully woven head cleaning tapes, and the major portion of the cleaning is provided by the supple and soft base material 34. As a result excessive wear of the magnetic head during the cleaning operation is avoided.

In an alternate embodiment of the invention, threads 38 and 40 are provided on both sides of the tape, as desired, in order to provide greater reinforcing. In this case, the threads also form projections or a roughened surface on the interior side of the tape. This feature is helpful in winding the tape and preventing slippage therebetween, as may occur when only the flat surface 43 is present.

In the illustrative embodiment of the present invention the threads 38 and 40 have a diameter of 0.1 – 0.5 mm., and preferably 0.16 mm, with threads 38 extending across the width of the tape but at a slight pitch angle thereto. On the other hand, threads 40 extend along the length of the tape and are at a slight angle with respect to the longitudinal axis thereof. Typically, the pitch between threads 38 is selected at between 2 to 5 mm. which corresponds to about one-half of the length of conventional magnetic heads which are usually between 4 to 10 mm. in width. In this manner, at least two threads 38 are engaged against the head during the cleaning operation so as to reinforce the non-woven fibrous base 34 against the tension applied to each portion of the tape as it engages the head. The pitch between threads 40 is about 2.5 mm. so that at least one length, and preferably two, of thread is always present in the longitudinal direction of the tape during the cleaning operation, since the width of the tape is approximately 3.81 mm.

The tape utilized in the illustrative embodiment of the present invention is generally about 1 to 1.5 meters long, which length corresponds to about 21 to 31 seconds of playing time, that is, cleaning time. The thickness of base 34 is selected to be, within the range of thickness of conventional magnetic recording tapes i.e., between 0.1 mm to 0.5 mm and preferably is 0.12 mm thick so as not to interfere with the normal operating conditions of the apparatus.

In use, cassette 10, having the cleaning tape 20 therein, is inserted in the tape recording and reproducing device in the same manner in which one would insert a conventional magnetic recording tape cassette. The apparatus is then set to the "play" position so that one of the reels 16 or 18 is driven to take up the tape from the other reel and pass it along the magnetic head of the apparatus. In this manner, the tape engages the head and crosses the air gap therein so that the threads 38 and base 34 are wiped across the tape to remove dust and other particles therefrom. The projections provided by threads 38 are particularly beneficial as they will remove and carry magnetic powder adhered to the magnetic head and also any rust which is formed on the head or guide pins of the apparatus. Similarly, dust on the head, pinch roller, capstan or other mechanical parts, and also any oil which may be present on these parts, will be softly wiped and removed by the fibrous base 34 as it passes thereby. Typically, with the cleaning tape of the present invention it will be sufficient to clean the magnetic head by running the tape in one direction only, for its full length. However, if the equipment is particularly dirty, the tape may be run in the reverse direction to provide increased cleaning action.

Accordingly, it is seen that a relatively strong and durable tape is provided which has a supple and soft base for gently wiping and cleaning the components of the magnetic tape recording and reproducing device in which it is used and which is reinforced and given strength and durability by the nylon or rayon woven threads secured thereto. As a result, a long service life can be expected from the cleaning tape of the present invention as compared to the cleaning sticks and paper tapes previously proposed. Further, the cassette is relatively simple and inexpensive to manufacture since it is constructed in the same manner as cassettes well known in the art. Similarly, the tape itself is relatively inexpensive to produce and it is secured in the cassette in the same manner as conventional magnetic tape. Accordingly, a relatively simple and inexpensive cleaning system has been provided by the invention disclosed herein.

Although an illustrative embodiment of the present invention has been described herein with reference to the accompanying drawings, it is to be understood that the invention is not limited to that precise embodiment, and that various changes and modifications may be effected therein by one skilled in the are without departing from the scope or spirit of this invention.

What is claimed is:

1. A tape cassette, having a generally hollow case and a pair of tape reels rotatably mounted therein, for use in a recording and reproducing apparatus having a magnetic head adapted to be engaged with tape in the cassette, wherein the improvement comprises a magnetic head cleaning tape having its opposed ends respectively secured to said reels for winding thereon, said tape having a base formed of non-woven fibrous material and a woven scrim of widely spaced reinforcing threads which project from at least a surface of said base which contacts said magnetic head for engaging and removing dust particles and the like from the head and wherein said reinforcing threads include a first set of threads extending across the width of said tape and slightly pitched with respect thereto such that at least two of said first set of threads are engaged with said magnetic head during the cleaning operation.

2. The tape cassette as defined in claim 1 including a second set of threads extending substantially transversely to said first set and at a slight angle to the longitudinal axis of the tape.

3. The tape cassette as defined in claim 2 wherein the pitch between the threads in said first set is between 2.5 and 5.0 mm.

4. The tape cassette as defined in claim 3 wherein the pitch between said second set of threads is approximately 2.5 mm.

5. A cleaning tape for use in recording and reproducing equipment having a magnetic head, said tape comprising an elongated base formed of non-woven fibrous materials and a reinforcing scrim having relatively widely spaced threads secured to at least one side of said base, said tape being adapted to engage the magnetic head in said recording and reproducing apparatus along said one side of said base for wiping said magnetic head to remove dust or the like therefrom, wherein said scrim includes first and second sets of threads on said one side of said tape which is adapted to be engaged with said magnetic head, said first set of threads being substantially parallel to each other and extending across the width of said tape and being slightly pitched with respect thereto, said second set of threads being substantially parallel to each other and extending substantially transversely to said first set and at a slight angle to the longitudinal axis of the tape, said threads forming projections on said one side of the tape for engaging and removing dust particles and the like from said magnetic head.

6. The cleaning tape as defined in claim 5 wherein said first and second sets of threads are woven.

7. The cleaning tape as defined in claim 6 wherein the pitch between the threads in said first set is between 2.5 and 5.0 mm.

8. The cleaning tape as defined in claim 7 wherein the pitch between said second set of threads is approximately 2.5 mm.

9. The cleaning tape as defined in claim 8 wherein said non-woven base and said threads are formed of nylon or rayon.

* * * * *